United States Patent
Hollenbach et al.

(10) Patent No.: US 6,731,728 B2
(45) Date of Patent: *May 4, 2004

(54) LOW NOISE LINE POWERED DAA WITH DIFFERENTIAL FEEDBACK

(75) Inventors: Keith Eugene Hollenbach, Kutztown, PA (US); Donald Raymond Laturell, Upper Macungie, PA (US); Steven Brooke Witmer, Sinking Spring, PA (US)

(73) Assignee: Agere Systems Inc., Allentown, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/055,991

(22) Filed: Apr. 7, 1998

(65) Prior Publication Data

US 2003/0035534 A1 Feb. 20, 2003

(51) Int. Cl.$^7$ .............................................. H04M 11/00
(52) U.S. Cl. .................. 379/93.36; 379/93.05
(58) Field of Search .................. 379/93.05, 93.29, 379/93.31, 93.36, 394–395, 398–402, 404–405, 406, 413, 169, 186, 322–324, 78–82, 391–392; 340/310.01–310.06; 375/220–222; 361/42; 363/91, 101

(56) References Cited

U.S. PATENT DOCUMENTS

| | | | | |
|---|---|---|---|---|
| 4,087,647 A | * | 5/1978 | Embree et al. | 379/413 |
| 4,264,785 A | * | 4/1981 | Jacobson | 379/82 |
| 4,302,805 A | * | 11/1981 | Marez et al. | 363/91 |
| 4,530,104 A | * | 7/1985 | Kamerman | 375/232 |
| 4,578,533 A | * | 3/1986 | Pierce | 379/93.31 |
| 4,622,441 A | * | 11/1986 | Martin | 379/345 |
| 4,796,295 A | * | 1/1989 | Gay et al. | 379/392 |
| 5,086,454 A | * | 2/1992 | Hirzel | 379/93.36 |
| 5,451,923 A | * | 9/1995 | Seberger et al. | 340/310.06 |
| 5,500,894 A | * | 3/1996 | Hershbarger | 379/399.02 |
| 5,528,685 A | * | 6/1996 | Cwynar et al. | 379/405 |
| 5,627,890 A | * | 5/1997 | Gay | 379/399.01 |
| 5,742,676 A | * | 4/1998 | Courtois | 379/413 |
| 5,774,316 A | * | 6/1998 | McGary et al. | 361/42 |
| 5,809,068 A | * | 9/1998 | Johnson | 375/222 |
| 5,946,393 A | * | 8/1999 | Holcombe | 379/399.01 |
| 6,091,806 A | * | 7/2000 | Rasmus et al. | 379/93.29 |
| 6,169,762 B1 | * | 1/2001 | Embree et al. | 375/220 |
| 6,205,219 B1 | * | 3/2001 | Hollenbach et al. | 379/413 |
| 6,212,226 B1 | * | 4/2001 | Newton | 375/222 |

* cited by examiner

Primary Examiner—George Eng
(74) Attorney, Agent, or Firm—William H. Bollman

(57) ABSTRACT

A telephone line interface or data access arrangement (DAA) is provided which draws power for the customer premises equipment from the telephone line. The DAA includes a shunt regulator as the power source drawing power from the telephone line, and a line modulator in series with the shunt regulator. A sense resistor is placed in series between the line modulator and shunt regulator to sense the line current. Accordingly, DC termination and AC modulation characteristics as presented by the DM to the telephone line can be adjusted by variation of an AC signal with DC offset input to the amplifier driving the line modulator without requiring a different DAA for use in regions or countries having various DC termination and AC modulation requirements. The differential feedback from a sense resistor reduces the noise induced in the circuit from the shunt regulator.

20 Claims, 6 Drawing Sheets

LOW NOISE LINE POWERED DAA WITH DIFFERENTIAL FEEDBACK

This application is similar to U.S. application No. 09/028,061, entitled "Low Noise Line Powered DAA With Feedback" by Hollenbach et al., which is explicitly incorporated herein by reference.

BACKGROUND OF THE INVENTION

1. Field of the Invention

This invention relates to a low noise telephone line interface for data access arrangements (DAA). More particularly, it relates to a line powered DAA having controllable DC termination and AC modulation.

2. Background of Related Art

Many portable computer devices utilize modems and other data devices for communicating over a telephone line. In such devices, battery size and weight is an important consideration. A balance must be reached between the size and weight of the overall device, which is dictated largely by the choice of battery, and an acceptable length of operation between charges.

Unfortunately, although operating an acceptable length of time when running typical application programs, the modems and other data communication devices of a portable computer utilize a large amount of power when communicating over a telephone line. The battery source which powers both the portable computer device and its modem is typically sized for general computing applications, and runs out of power quickly when actively communicating over a telephone line through a modem. Portable computer devices such as personal digital assistants (PDAs), hand held PCs (HPC), PCMCIA modems, and portable data terminals are designed to operate up to several hours on a single battery charge, but operate only fractions of an hour on a single battery charge when communicating via modem. Thus, although portable computer devices operate a sufficient length of time for quick data transfers over a modem powered completely by a battery, they typically require that external AC power be applied to allow for longer uses of the modem. It is therefore desirable for battery powered computer devices including a modem to draw power, in addition to the inherent battery, from a secondary power source.

The DC power inherent in a telephone line provides a convenient source of power, but there are often limitations and restrictions which limit the ability of a modem to derive power from the telephone line. For instance, present regulations in the United States are such that significant current may only be drawn from the telephone line when the telephone or modem is in an off-hook or active condition. In order to hold the telephone line in an off-hook condition, current in the approximate range of 20 milliamps (mA) to 150 mA must be drawn. Thus, the maximum amount of current drawn from the telephone line is limited.

Modems which are designed to be powered entirely from the telephone line are known, but these designs either suffer from an extremely constrained power budget, or are wasteful of the available current. Moreover, modems in general are also subject to government constraints, e.g., FCC Part 68 requirements for telephones in the U.S., and limitations on effects and noise which may be placed back on the telephone line, placing further restrictions on the use of power from the telephone line.

A Data Access Arrangement (DM) provides the physical interface between a data source such as a modem, and a telephone line. The DAA is responsible for presenting the proper DC termination and AC modulation characteristics to the telephone line. For instance, the DAA must draw a minimum amount of DC current when in the off-hook condition to hold the telephone line in an off-hook condition, but at the same time must draw no more than a maximum amount of current while in the off-hook condition. Thus, the DC termination or load must be within prescribed limits corresponding to the pertinent telephone standards of the country in which the DAA is being used. Accordingly, the modem must operate with no more than the prescribed maximum current available from a telephone line in the particular country in which the DAA is being used.

In today's global economy, it is desirable to design and manufacture products for use in any of a plurality of different countries, not just for a single country. However, the regulations with respect to the available amount of power on a telephone line in the different countries varies greatly, as does the minimum amount of current the customer premises equipment must draw (i.e., the DC load) to guarantee an off-hook condition. Thus, a DAA used in one country must provide DC termination and AC modulation characteristics to a telephone line which may be and often are entirely different from the DC termination and AC modulation characteristics presented by a DAA used in another country. Accordingly, manufacturers conventionally manufacture different DAAs including different physical components for each of the varying countries.

FIG. 1 shows a typical DM including a parallel combination of an AC line modulator 102 and a DC termination circuit 103. A modem or other data device including the DAA shown in FIG. 1 provides an AC modulation signal 108 to drive the AC line modulator 102. When used in countries with differing standards, many of the components in the DC termination circuitry 103 and/or in the AC line modulator 102 are changed to conform to the telephone company standards in the particular country in which the DAA is being used. This unfortunately requires products incorporating the DMs to be manufactured and packaged separately for each of a plurality of varying countries.

There is a need for a DM which provides low noise line power for a modem or other data device, and which is software customizable for each of a plurality of varying countries without requiring different hardware components to be in conformance with the different DC termination and AC modulation requirements of those particular countries.

SUMMARY OF THE INVENTION

In accordance with the principles of the present invention, a telephone line interface comprises a shunt regulator. A line modulator is in series with the shunt regulator. An amplifier, powered by the shunt regulator, drives the line modulator. The telephone line interface further includes a feedback loop from the line modulator to the amplifier.

In accordance with another aspect of the present invention, a telephone line interface includes a shunt regulator to draw power from a telephone line. A sense resistor is connected in series with the shunt regulator. A line modulator is in series with the sense resistor and the shunt regulator. A differential feedback path is also provided from opposite terminals of the sense resistor to the line modulator.

A method of powering customer premises equipment from a telephone line is also provided, comprising drawing power from the telephone line with a shunt regulator. A line modulator is provided in series with the shunt regulator. An amplifier is powered with power drawn from the telephone line. The line modulator is driven with the line powered amplifier, and a signal is fed back from the line modulator to an input of the line powered amplifier.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

A driving motivation of the present invention was to provide a line powered DM device having reduced noise which is otherwise present. The present invention is particularly useful for use with modems or other line powered data sources, including a digital signal processor (DSP) which provides a modulating AC signal for driving a line modulator. Although a DSP is not required to practice the present invention, the use of a line powered DSP generally increases the noise of a DAA and thus makes the need for reduced noise techniques that much more acute.

Figure 1:
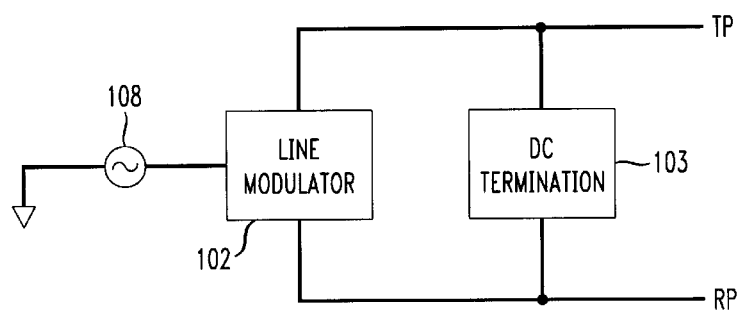
FIG. 1 shows a conventional DAA.

A suitable conventional DAA circuit is shown in FIG. 1. However, this DM does not provide power from the telephone line. Nevertheless, this conventional circuit typically exhibits low noise generation in the DAA because the tip polarity TP signal and ring polarity signal RP provide a common mode to both the line modulator 102 and the DC termination circuit 103 which are in parallel across the tip polarity signal TP and ring polarity signal RP.

The DC termination 103 also provides the important function of protecting the DAA, including the line modulator 102 and other modem circuitry, from voltage surges on the telephone line in excess of, e.g., 30 volts. Conventional DC termination circuits 103 use bipolar circuitry in connection with the telephone line. Although MOS components make better switches, they are better suited for lower voltage applications as they are subject to latch up or other destructive abnormalities at voltages as high as 30 volts. Thus, bipolar components are preferred over MOS components in conventional DC termination circuits 103. Moreover, a further disadvantage of the conventional circuit topology as shown in FIG. 1 is that the DC termination circuitry 103 is fixed and separate from the AC modulation circuitry, and not otherwise controllable in characteristic without changing components. Thus, a different DC termination circuit 103 is required for each varying country in which the DAA will be used.

One alternative arrangement to the prior art DAA shown in FIG. 1 adds a feature of providing line power to a line modulator, modem and/or other circuitry. The circuit in FIG. 2 implements a shunt regulator 200 in parallel with each of a line modulator 102 and a DC termination circuit 103 to provide power drawn from a telephone line to an amplifier 220 and other modem or data processing circuitry.

Figure 2:
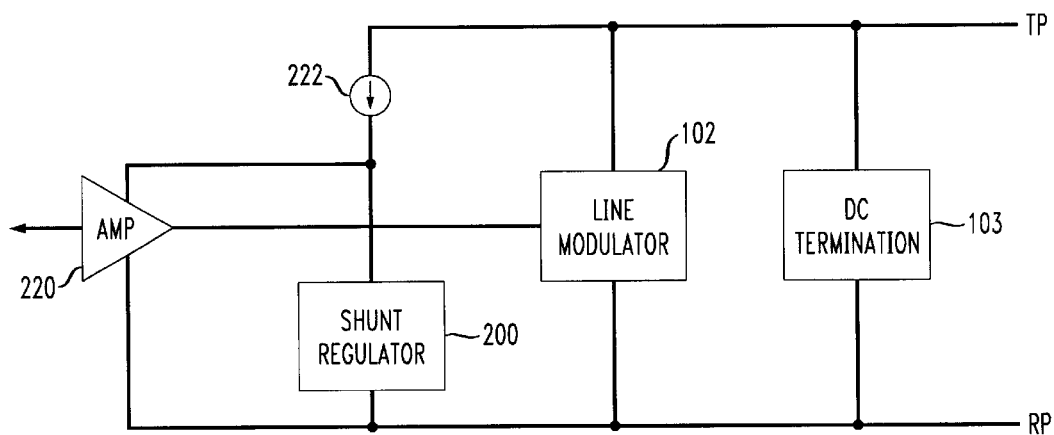
FIG. 2 shows a possible configuration for a DM providing line power to a modem useful for explaining the present invention.

In FIG. 2, the shunt regulator 200 is placed across the tip polarity signal TP and ring polarity signal RP, and thus is in common mode with the circuitry it is protecting, i.e., the shunt regulator 200 and the powered circuitry share a common ground reference, i.e., the ring polarity signal RP. The conventional AC line modulator 102 is driven by an AC signal from an amplifier 220. The amplifier 220 and line modulator 102 are both powered by power derived by the shunt regulator 200 from the telephone line. The shunt regulator 200 provides a constant voltage power source, e.g., at 3 volts, at a maximum current level determined only by the draw of the amplifier 200 and other modem circuitry. The total power drawn by the modem circuitry is represented by current source 222. Because the DC termination circuitry 103 is in parallel with the shunt regulator 200, the DC termination circuitry 103 ensures that the voltage input to the shunt regulator 200 will not exceed a predetermined amount, e.g., 3 or 5 volts. Thus, MOS circuitry can be utilized in the shunt regulator 200 or other portions of the modem. In an ideal situation, it is desired that the shunt regulator 200 merely regulate power drawn by the modem, but not actually draw and thus waste current itself. Generally, wasted current is to be avoided in line powered devices.

The circuit of FIG. 2 retains the advantages the protection of a conventional parallel DC termination circuit 103 provides, e.g., 30 volt maximum voltage protection, but does not allow easy adjustment of the DC termination circuit 103 for use in various countries without changing components within the DC termination circuit 103. As discussed, this is disadvantageous in a world in which it is desirable to sell an identically-manufactured product in more than one country.

Figure 3:
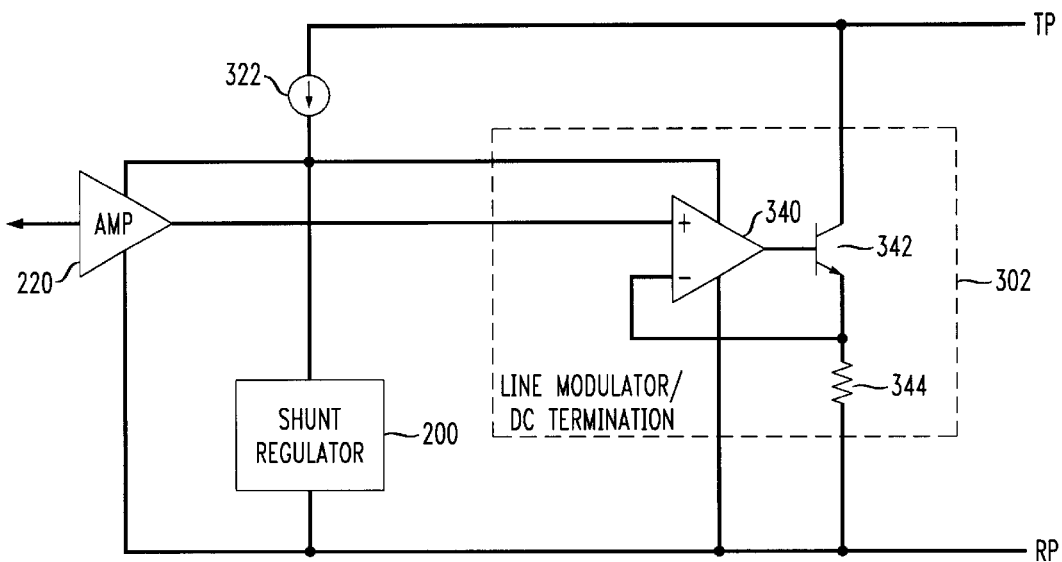
FIG. 3 shows another possible configuration for a DAA providing line power to a modem useful for explaining the present invention.

In an alternative arrangement, the DC termination circuit could theoretically be combined with a line modulator as depicted in the circuit shown in FIG. 3.

In FIG. 3, a combined line modulator and DC termination circuit 302 is formed from an operational amplifier (op amp) 340, bipolar transistor 342, and resistor 344. The bipolar transistor 342 and resistor 344 are connected in series across the tip polarity TP and ring polarity RP signals from a telephone line. The op amp 340 receives the AC modulating signal at the non-inverting input, while the inverting input of the op amp 340 is connected to the emitter of bipolar transistor 342. The op amp 340 is powered from the line power derived by the shunt regulator 200, as is the amplifier 220 and other circuitry providing the AC modulating signal.

The circuit shown in FIG. 3 is suitably noise free because the combined line modulator/DC termination circuit 302 and shunt regulator 200 have a common ground reference, i.e., the ring polarity signal RP, but suffers from the possibility of wasted current, which is extremely valuable in a line powered device. To eliminate wasted current, it might be theoretically possible to determine the exact amount of current required by the line modulator/DC termination circuit 302 and other modem circuitry which is to be powered by the shunt regulator 200. However, current usage typically varies based on a multitude of factors, e.g., the manufactured tolerance of components, the frequency of the AC modulating signal, the temperature of the circuitry, etc. Thus, a safety factor reserving an amount of available current must be provided by the shunt regulator 200 to ensure proper operation of the DM over a specified range of temperature and frequency. This safety factor corresponds to wasted and/or unusable current from the telephone line in an off-hook condition, further limiting the amount of power from a telephone line which can actually be used.

Figure 4:
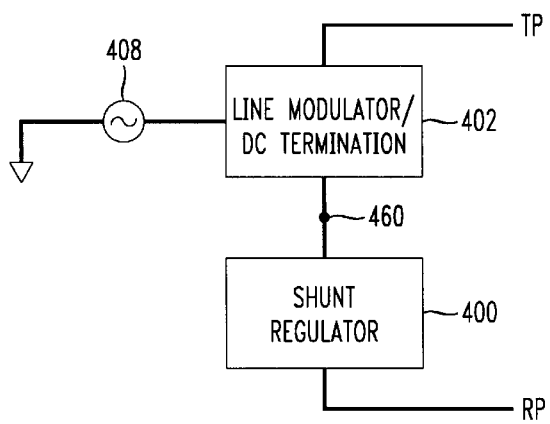
FIG. 4 shows a line modulator and shunt regular in series in an arrangement useful for explaining the present invention.

To maximize the use of line power in a DAA with reduced noise, the present invention places a combined line modulator/DC termination circuit in series with a shunt regulator as shown in FIG. 4. In this way, current drawn from the telephone line will pass through the shunt regulator 400 as if the shunt regulator was not there, eliminating the need to worry about designing a shunt regulator to draw only exactly a predetermined certain amount of current from a telephone line for use by a line modulator and other modem circuitry. All current flows in a single series circuit as shown in FIG. 4, not in two parallel circuits as shown in the common mode shunt regulator circuits shown in FIGS. 2 and 3. Thus, there is no guessing in the shunt regulator 400 as to exactly how much current must be drawn from the telephone line for use by the modem circuitry. When the shunt regulator 400 is in series with circuitry which it is powering, the shunt regulator knows exactly how much current is required from the telephone line.

However, unlike when a shunt regulator is placed in parallel with and thus in common mode with circuitry which it is powering as depicted in FIGS. 2 and 3, the series connection of a shunt regulator 400 and a line modulator 402 introduces a noise problem in the DAA. The noise is largely a result of the line modulator 402 having a different ground reference than the shunt regulator 400. Thus, unless accounted for, the circuit shown in FIG. 4 would exhibit a problem of undesired noise.

In accordance with the principles of the present invention, a feedback loop is established to eliminate undesirable noise currents between the line modulator/DC termination circuit 402 and the shunt regulator 400, i.e., at node 460 shown in FIG. 4.

Figure 5:
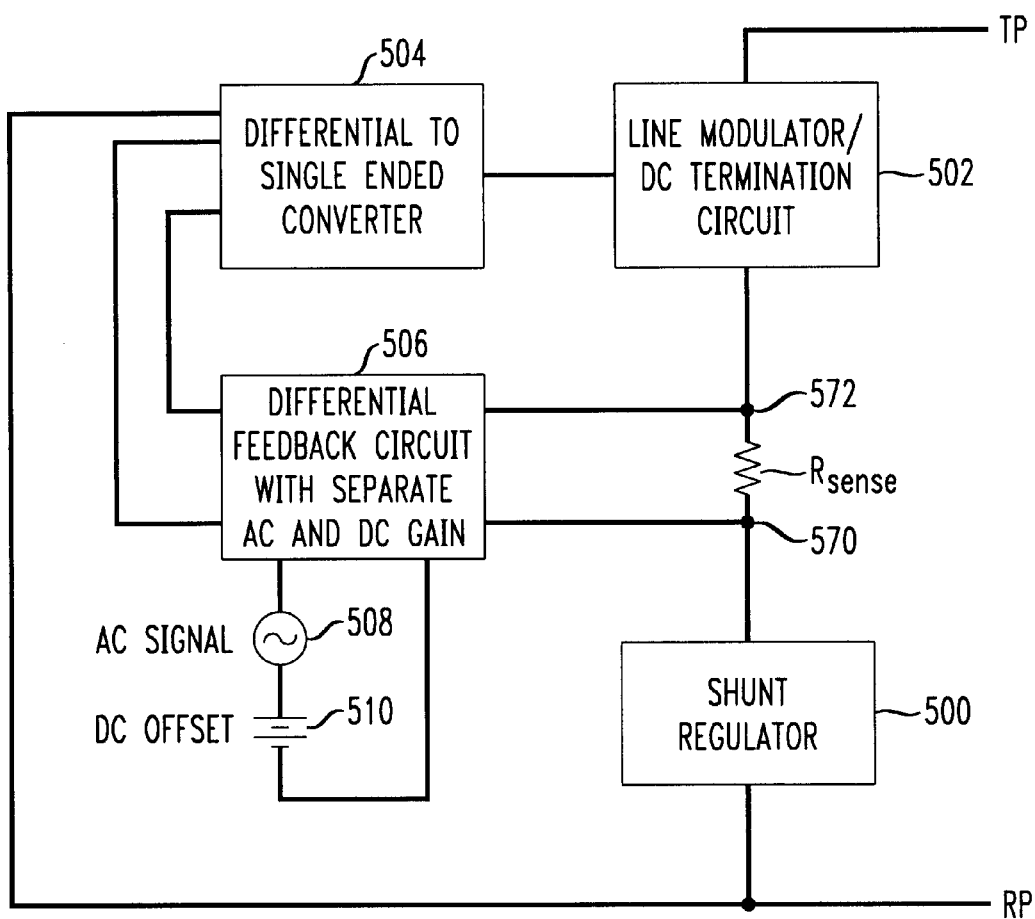
FIG. 5 shows a low noise line powered DM in accordance with the principles of an embodiment of the present invention.

FIG. 5 shows a first embodiment of the present invention utilizing a differential feedback loop to eliminate undesirable noise as sensed across a sense resistor connected to the line power supply output of a shunt regulator.

In particular, FIG. 5 shows a shunt regulator 500 in series with a line modulator/DC termination circuit 502. A sense resistor $R_{sense}$ is placed in series between the line modulator/DC termination circuit 502 and the shunt regulator 500. In the first embodiment of the present invention, the nodes 570, 572 at both terminals of sense resistor $R_{sense}$ provide a differential input to a differential feedback circuit 506 to reduce the noise otherwise present at node 570.

Differential feedback circuit 506 preferably has separate AC and DC gain providing further controllable flexibility in the DAA for use in countries with different DC termination and AC modulation characteristic requirements. The differential output of the differential feedback circuit 506 is converted to a single ended output by a differential to single ended converter 504. The single ended output is used to control the line modulator/DC termination circuit 502 in a way which allows adjustment of the AC modulation and DC termination characteristics presented to the telephone line.

An analog signal including an AC modulation component 508 and a DC offset component 510 is input to the differential feedback circuit 506. The level of the DC offset component 510 controls the effective load of the DC termination presented to the telephone line by the line modulator/DC termination circuit 502. Moreover, the AC signal 508 may be adjusted to change the AC characteristics of the output of the line modulator/DC termination circuit 502 to correspond to desired AC characteristics peculiar to the standards of a particular country.

Accordingly, the DC termination and AC modulation presented by a DM to a telephone line are controlled in accordance with the principles of the present embodiment simply by adjusting a DC offset and AC signal provided by a DSP or other device. In this way, only one device implementing a DM according to the present invention need be manufactured for virtually all countries, requiring only a software change to adjust DC termination and/or AC modulation characteristics of a DAA to allow use of such device in any of a plurality of countries.

Figure 6:
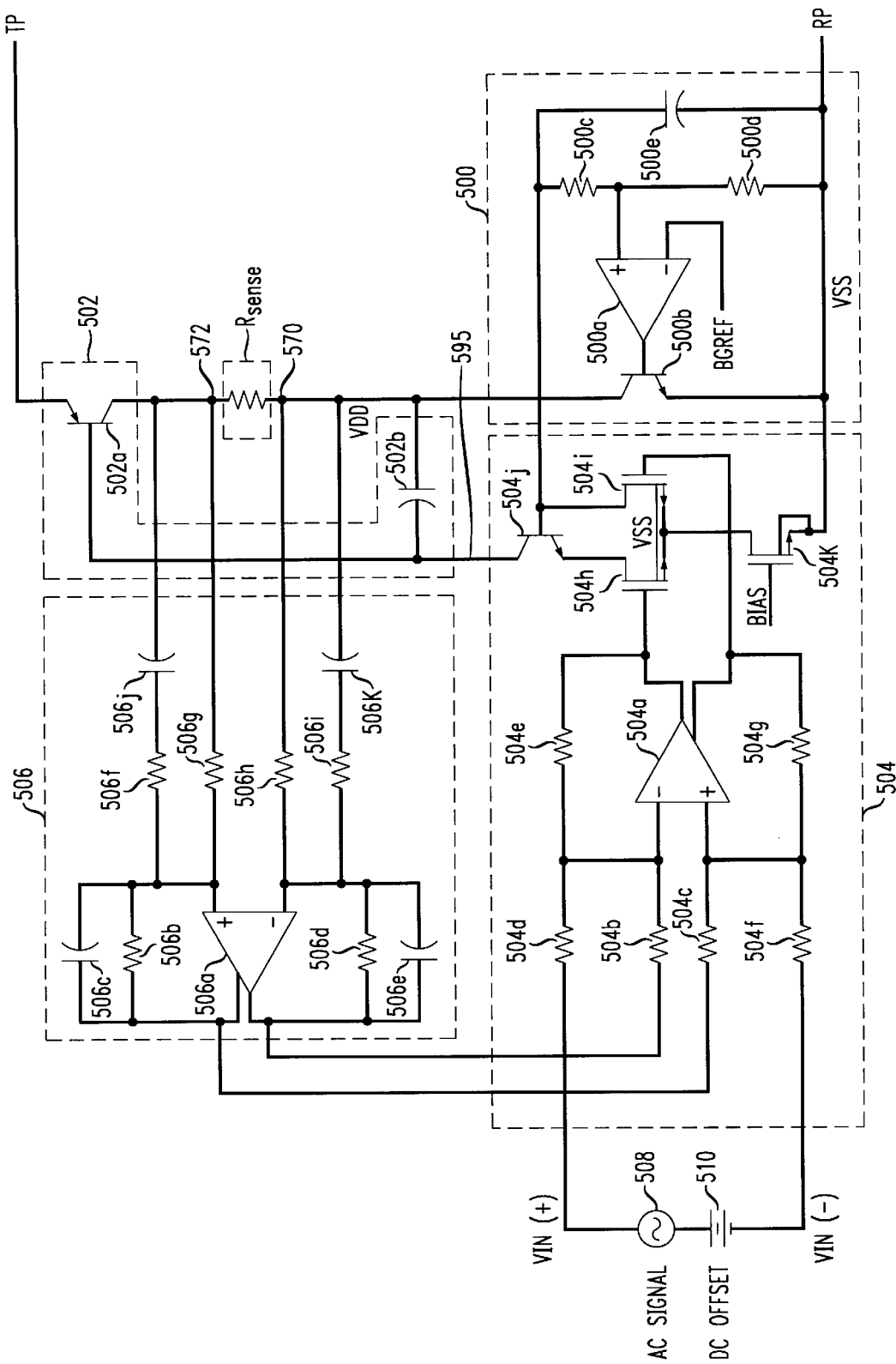
FIG. 6 is a more detailed schematic drawing of the low noise line powered DM in accordance with the principles of an embodiment of the present invention.

FIG. 6 shows the DM of FIG. 5 in more detail.

In particular, the line modulator/DC termination circuit 502 comprises a bipolar transistor 502a in series with a sense resistor $R_{sense}$ and a shunt regulator 500. A compensation capacitor 502b is placed between the base of the bipolar transistor 502a and node 570.

The shunt regulator 500 includes an op amp 500a driving a bipolar transistor 500b to regulate the sourced power. The non-inverting input of the op amp 500a is connected to a voltage divider circuit comprised of two series resistors 500c, 500d, and the inverting input of the op amp 500a is set to a ground reference value BGREF. A storage capacitor 500e is placed between power and ground of the shunt regulator 500.

The differential feedback circuit 506 includes a differential output op amp 506a. The non-inverting input of the differential op amp 506a is connected to node 572 via a parallel combination of a resistor 506g, and a resistor 506f and capacitor 506j in series. The inverting input of the differential op amp 506a is connected to node 570 via a parallel combination of a resistor 506h, and a resistor 506i and a capacitor 506k in series. The non-inverting output of the differential op amp 506a is fed back to the non-inverting input through a parallel combination of a resistor 506b and a capacitor 506c. Similarly, the inverting output of the differential op amp 506a is fed back to the inverting input through a parallel combination of a resistor 506d and capacitor 506e.

The differential output of the differential feedback circuit 506 is converted to a single ended signal by the differential to single ended converter 504. The differential signal is input to the inverting and non-inverting inputs of a differential op amp 504a through resistors 504b and 504c, respectively. The positive node of the AC modulating signal 508 with DC offset 510 is input to the inverting input of differential op amp 504a through a resistor 504d, while the negative node of the AC modulating signal 508 with DC offset 510 is input to the non-inverting input through a resistor 504f. The inverting output of differential op amp 504a is fed back to its inverting input through resistor 504e, and the non-inverting output of differential op amp 504a is fed back to its non-inverting input through resistor 504g. The differential output of the differential op amp 504a is converted to a single ended signal at node 595 for controlling the line modulator/DC termination circuit 502 by a parallel combination of MOS transistors 504h and 504i, and bipolar transistor 504j.

A bias voltage BIAS may be applied to the gate of a MOS transistor 504k in series with the combination of transistors 504h and 504i, to provide a current source for transistors 504h and 504i.

Figure 7:
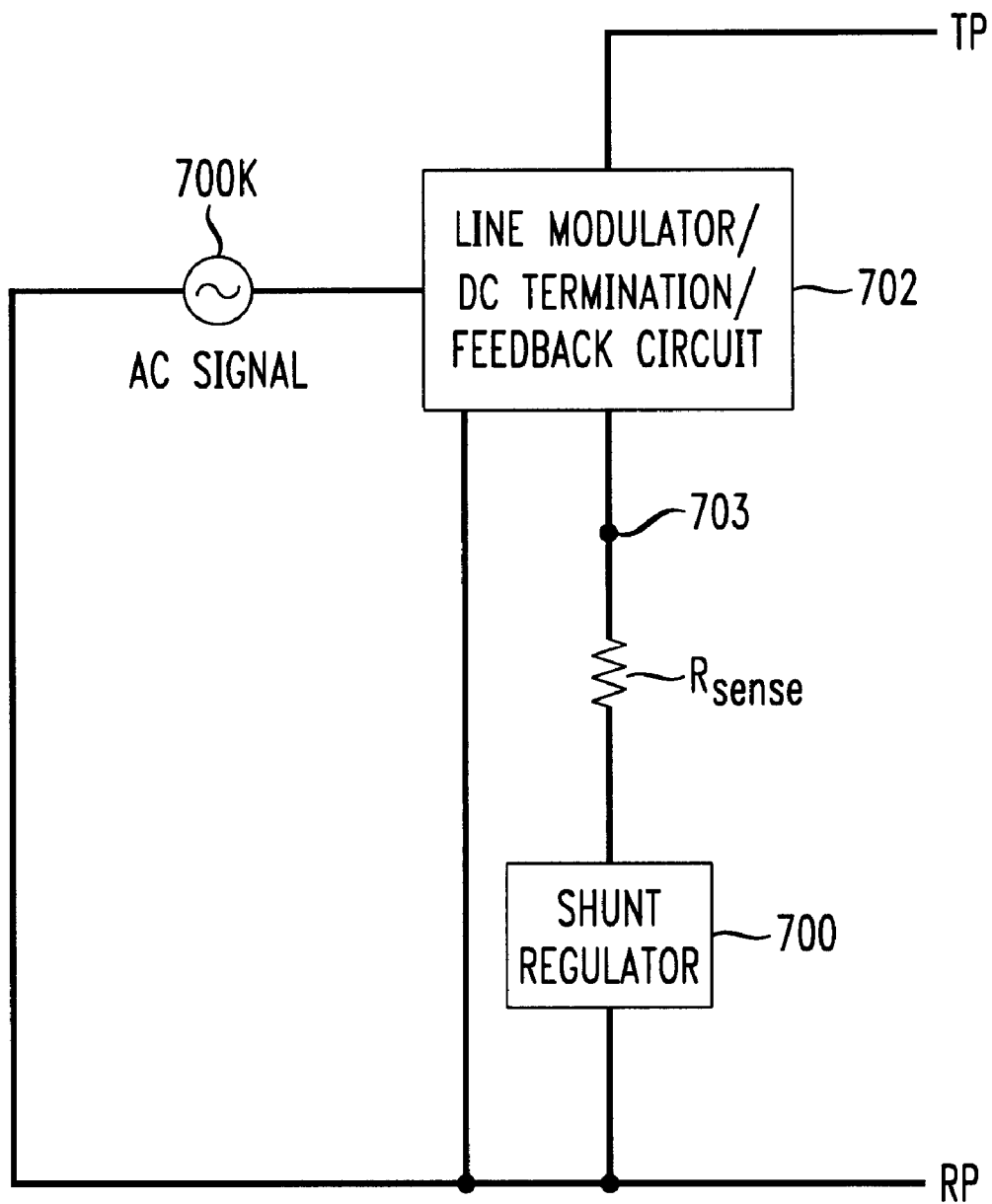
FIG. 7 shows a line powered DAA in accordance with the principles of another embodiment of the present invention.

FIG. 7 shows an alternative embodiment utilizing a single ended feedback loop and a common ground reference with the shunt regulator 700 to provide controllable AC modulation and DC termination characteristics to the telephone line.

In FIG. 7, only one terminal 703 of a sense resistor $R_{sense}$ between the series connection of the line modulator 702 and the shunt regulator 700 is sensed to provide a single ended feedback loop. The circuit of FIG. 7 is partially in series with the shunt regulator 700 yet retains a common ground reference with the shunt regulator 700 to the ring polarity signal RP.

Figure 8:
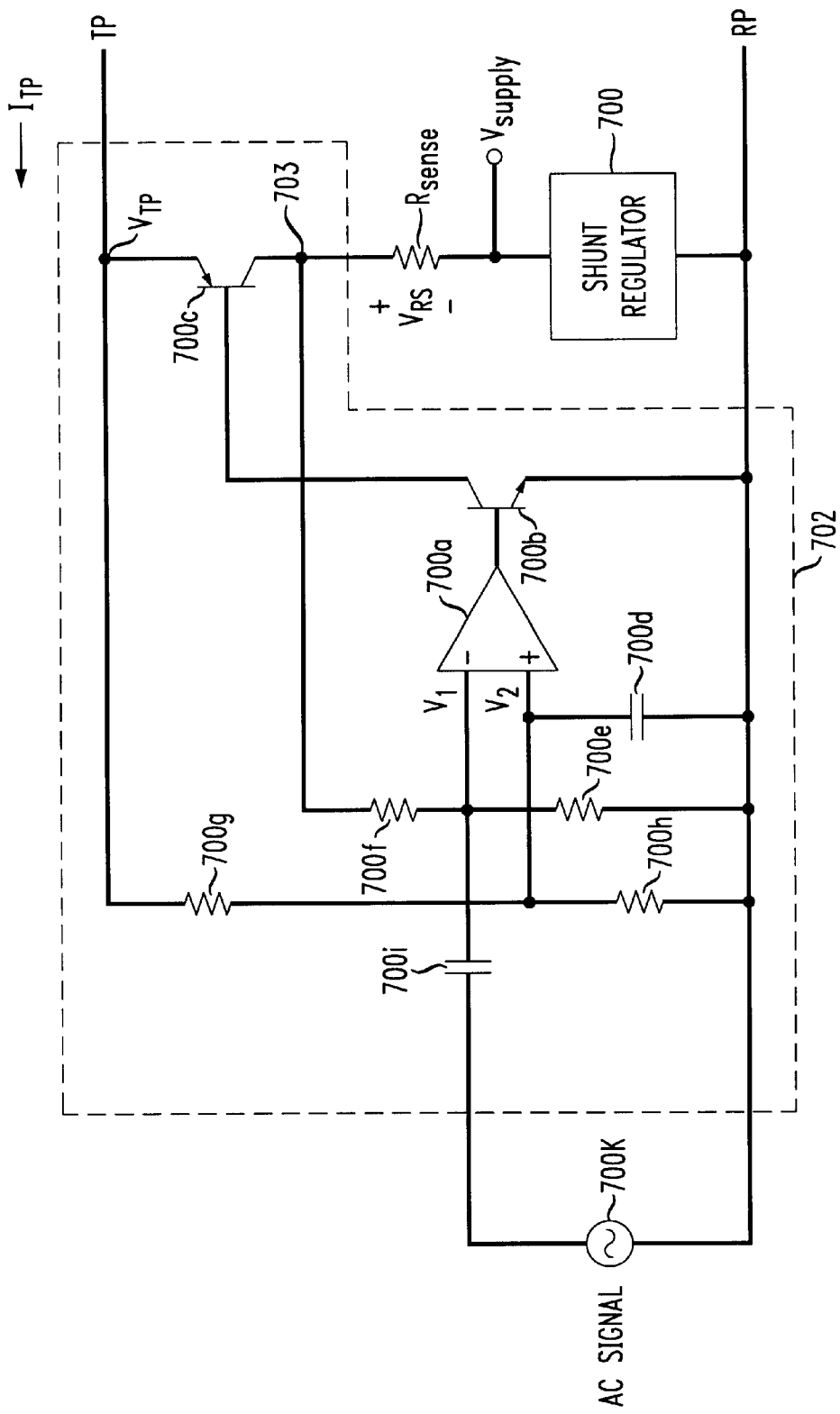
FIG. 8 is a more detailed schematic drawing of the line powered DAA shown in FIG. 7.

FIG. 8 shows the circuit of FIG. 7 in more detail. In particular, the line modulator 702 includes two single ended feedback loops. One feedback loop is from tip polarity (TP), and feeds back DC line voltage. The other feedback loop is from one terminal 703 of the sense resistor $R_{SENSE}$ and feeds back a voltage proportional to the line current. These feedback signals are used to set the DC termination and AC modulation characteristics. The line voltage feedback is divided down by resistor 700g and 700h and fed to the non-inverting terminal of op amp 700a. Resistor 700h is in parallel with capacitor 700d to filter out AC voltage. The line current voltage feedback is divided down by resistor 700f and resistor 700e and fed to the inverting terminal of op amp 700a. The sense resistor $R_{sense}$ is typically about 20 ohms, providing a gain of about thirty based on a telephone line impedance of about 600 ohms from the point of view of the tip polarity TP and ring polarity RP terminals. Thus, the noise at node 703 is amplified about 600/20=30 times as measured at tip polarity TP and ring polarity RP.

Of course, other values for the sense resistor $R_{sense}$ may be appropriate, e.g., 10 ohms, based on the particular application and/or the requirements of the central office.

Moreover, the shunt regulator 500, sense resistor $R_{sense}$, and line modulator/DC termination circuit 502 are in a series circuit between the tip polarity TP and ring polarity RP terminals. Accordingly, since the current is equal through the series circuit, those of ordinary skill in the art will appreciate that the order of the shunt regulator 500, sense resistor $R_{sense}$, and line modulator/DC termination circuit 502 may be placed in any order. For instance, the shunt regulator 500 as shown in FIG. 5 can be moved to a position between the tip polarity TP terminal and the line modulator/DC termination circuit 502 with the same results as described herein.

The shunt regulator 700 provides power drawn from the telephone line to the line modulator/DC termination and feedback circuit 702 as well as to other modem and/or data processing circuitry necessary to provide a DC termination and AC modulation to the telephone line. An AC signal 700k from a DSP or other modem circuitry powered by the shunt regulator 702 is AC coupled to the operational amplifier 700a of the line modulator 702 through a capacitor 700i.

A bipolar pnp transistor 700c placed in series with the shunt regulator 700 provides the AC modulation to the telephone line, and draws the prescribed amount of current from the telephone line, i.e., presents a DC termination to the telephone line. The output of the operational amplifier 700a drives the base of bipolar npn transistor 700b, the collector of which drives the base of transistor 700c. The tip polarity TP to ring polarity RP DC voltage is divided down and coupled to the non-inverting terminal of operational amplifier 700a through resistors 700g and 700h and capacitor 700d.

A portion of the DC termination of the line modulator/DC termination/feedback circuit 702 is established by the value of resistors 700g, 700h, 700f and 700e. Resistor 700g is in series with resistor 700h, and resistor 700f is in series with resistor 700e, both series connections of which are placed in parallel with the tip polarity signal TP and ring polarity signal RP of the telephone line.

The circuit shown in FIGS. 7 and 8 senses the voltage $V_{TP}$ with respect to the ring polarity signal RP, and the current $I_{TP}$ of the tip polarity signal TP, and feeds back proportional voltages $V_1$, $V_2$ determined by the voltage division of resistors 700f and 700e, and 700g and 700h, respectively, to the inverting and non-inverting inputs of operational amplifier 700a, respectively. The AC component of the voltage $V_{TP}$ of the tip polarity signal TP is shunted to ground via capacitor 700d.

The governing equation for the equivalent impedance of the circuit shown in FIGS. 7 and 8 is as follows:

$$Z_{in} = \frac{V_{TP}}{I_{TP}} = R_{sense} \frac{sC_{700d}R_{700g}R_{700h} + R_{700g} + R_{700h}}{R_{700f} + R_{700e}} + \frac{V_{Rsense}}{k_1 I_{TP}} \quad \text{Eq. (1)}$$

where:

$$k_1 = \frac{R_{700h}}{R_{700e}} R_{700f} + \frac{R_{700e}}{sC_{700d}R_{700g}R_{700h} + R_{700g} + R_{700h}} \quad \text{Eq. (2)}$$

Equation (1) is of the desired form $sL_{effective} + R_{effective}$ where:

$$L_{effective} = \frac{C_{700d}R_{700g}R_{700h}R_{sense}}{R_{700f} + R_{700e}} \quad \text{Eq. (3)}$$

$$R_{effective} = \frac{R_{sense}(R_{700g} + R_{700h})}{R_{700f} + R_{700e}} + \frac{V_{SR}}{k_1 I_{TP}} \quad \text{Eq. (4)}$$

wherein $V_{SR}$ represents the voltage across the shunt regulator. The error term in Equation (4), $V_{SR}|k_1I_{TP}$, is to be considered when the component values for the circuit of FIGS. 7 and 8 are chosen.

The line modulation gain is determined (neglecting the impedance of AC coupling capacitor $C_{700i}$), by the following equation:

$$A_{mod} = \frac{R_{700f}}{R_{700j}} \frac{Z_{PSTN}}{R_{sense}} \quad \text{Eq. (5)}$$

where $Z_{PSTN}$ is the impedance of the public switched telephone network (PSTN) to which the telephone line is connected at the other end.

Accordingly, the present invention provides a low noise DAA particularly useful for modems including DSPs and/or other line powered devices, and which includes DC termination and AC modulation characteristics which are software customizable for use in each of a plurality of countries. In this way, a common DAA can be manufactured and used in products in many countries, with the only difference between the products used in the various countries being in the software.

While the invention has been described with reference to the exemplary preferred embodiments thereof, those skilled in the art will be able to make various modifications to the described embodiments of the invention without departing from the true spirit and scope of the invention.

We claim:

1. A telephone line interface comprising:
    a shunt regulator;
    a line modulator in series with said shunt regulator between a tip side and a ring side of a telephone line input, to maximize line power with reduced noise;

an amplifier, powered by said shunt regulator, to drive said line modulator; and a feedback loop from said line modulator to said amplifier.

2. The telephone line interface according to claim 1, further comprising:

a sense resistor connected to said shunt regulator.

3. The telephone line interface according to claim 2, wherein:

said sense resistor is connected in series between said shunt regulator and said line modulator.

4. The telephone line interface according to claim 2, wherein:

said feedback loop is connected to said sense resistor.

5. The telephone line interface according to claim 4, wherein:

said feedback loop is a differential feedback loop.

6. The telephone line interface according to claim 5, wherein:

said differential feedback loop is connected to opposite ends of said sense resistor.

7. The telephone line interface according to claim 1, wherein said feedback loop includes:

a differential to single ended converter.

8. The telephone line interface according to claim 7, further comprising:

a modulated AC signal having a DC offset voltage;

said modulated AC signal having said DC offset voltage being input to said differential to single ended converter.

9. The telephone line interface according to claim 1, wherein:

said telephone line interface is a data access arrangement for a modem.

10. A telephone line interface comprising:

a shunt regulator to draw power from a telephone line;

a sense resistor connected in series with said shunt regulator;

a line modulator in series with said sense resistor and said shunt regulator between a tip side and a ring side of a telephone line input, to maximize telephone line power with reduced noise; and a differential feedback path from opposite terminals of said sense resistor to said line modulator.

11. The telephone line interface according to claim 10, further comprising:

a differential to single ended converter to convert said differential feedback path to a single ended control path to modulate said line modulator.

12. A method of powering customer premises equipment from a telephone line, comprising:

drawing power from said telephone line with a shunt regulator;

providing a line modulator in series with said shunt regulator between a tip side and a ring side of a telephone line input, to maximize telephone line power with reduced noise;

powering an amplifier with power drawn from said telephone line;

driving said line modulator with said line powered amplifier; and feeding back a signal from said line modulator to an input of said line powered amplifier.

13. The method of powering customer premises equipment according to claim 12, further comprising:

differentially sensing an amount of noise in a telephone line interface of said customer premises equipment.

14. The method of powering customer premises equipment according to claim 13, wherein:

said signal fed back from said line modulator is representative of said sensed amount of noise.

15. The method of powering customer premises equipment according to claim 13, wherein:

said amount of noise is sensed across a sense resistor.

16. The method of powering customer premises equipment according to claim 13, wherein:

said amount of noise is differentially sensed from two points between said line modulator and said shunt regulator.

17. Apparatus for powering customer premises equipment from a telephone line, comprising:

means for drawing power from said telephone line;

means for modulating said telephone line, connected in series with said means for drawing power from said telephone line between a tip side and a ring side of a telephone line input, said means for modulating said telephone line maximizing telephone line power with reduced noise;

an amplifier powered by said means for drawing power from said telephone line;

means for driving said means for modulating said telephone line; and means for feeding back a signal from said means for modulating to an input of said amplifier.

18. The apparatus for powering customer premises equipment according to claim 17, wherein said means for feeding back said signal includes:

means for differentially sensing an amount of noise in a telephone line interface of said customer premises equipment.

19. The apparatus for powering customer premises equipment according to claim 18, further comprising:

noise sensing means connected between said means for modulating and said means for drawing power from said telephone line.

20. The apparatus for powering customer premises equipment according to claim 18, wherein said means for differentially sensing includes:

a sense resistor connected between said means for drawing powering and said means for modulating.

* * * * *